US009792198B2

(12) United States Patent
Yawn et al.

(10) Patent No.: US 9,792,198 B2
(45) Date of Patent: *Oct. 17, 2017

(54) DEBUGGER WITH METHOD RESTART CAPABILITY

(71) Applicant: Oracle International Corporation, Redwood City, CA (US)

(72) Inventors: Michael I. Yawn, Roseville, CA (US); Neil James Cochrane, Alameda, CA (US); Campegius L. Bronkhorst, Tuscson, AZ (US)

(73) Assignee: Oracle International Corporation, Redwood City, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/809,015

(22) Filed: Jul. 24, 2015

(65) Prior Publication Data
US 2015/0339211 A1 Nov. 26, 2015

Related U.S. Application Data

(63) Continuation of application No. 13/788,701, filed on Mar. 7, 2013, now Pat. No. 9,122,798.

(51) Int. Cl.
*G06F 9/44* (2006.01)
*G06F 11/36* (2006.01)
(Continued)

(52) U.S. Cl.
CPC ........ *G06F 11/3624* (2013.01); *G06F 3/0484* (2013.01); *G06F 8/70* (2013.01);
(Continued)

(58) Field of Classification Search
CPC ........ G06F 3/0484; G06F 11/32; G06F 11/34; G06F 11/3624; G06F 11/3664; G06F 9/44; G06F 8/70
See application file for complete search history.

(56) References Cited

U.S. PATENT DOCUMENTS 5,226,162 A * 7/1993 Daw .................. G06F 9/44
                                                  703/22
5,974,572 A * 10/1999 Weinberg ............ G06F 11/32
                                                  707/E17.116
(Continued)

OTHER PUBLICATIONS

Katharina Mehner et al., "JaVis: A UML-Based Visualization and Debugging Environment for Concurrent Java Programs", [Online], 2002, pp. 163-175, [Retrieved from Internet on Jan. 30, 2017], <http://download.springer.com/static/pdf/365/chp%253A10.1007%252F3-540-45875-1_13.pdf>.*

(Continued)

*Primary Examiner* — Ziaul A Chowdhury
(74) *Attorney, Agent, or Firm* — Robert C. Kowert; Meyertons, Hood, Kivlin, Kowrt & Goetzel, P.C.

(57) ABSTRACT

Methods and apparatus for debuggers supporting method restart are described. A method comprises implementing a user interface (UI) enabling a user to submit a request, via a single interaction within a debugging session, to restart execution of an invocable operation of a program. The method further comprises, in response to a request to restart an invocable operation, designating, as the source code line whose corresponding executable code is to be executed next, the first line of source code of the particular invocable operation that corresponds to an executable operation. The method includes indicating that execution of the program is to be resumed at the first line, and resuming execution of the program at the first line.

20 Claims, 7 Drawing Sheets

(51) Int. Cl.
*G06F 11/34* (2006.01)
*G06F 11/32* (2006.01)
*G06F 3/0484* (2013.01)

(52) U.S. Cl.
CPC .............. *G06F 11/32* (2013.01); *G06F 11/34* (2013.01); *G06F 11/3664* (2013.01); *G06F 9/44* (2013.01)

(56) References Cited

U.S. PATENT DOCUMENTS

| | | | |
|---|---|---|---|
| 6,011,920 A * | 1/2000 | Edwards | G06F 11/3664 714/E11.21 |
| 6,042,614 A | 3/2000 | Davidson et al. | |
| 6,412,106 B1 * | 6/2002 | Leask | G06F 11/3664 714/E11.217 |
| 6,598,181 B1 * | 7/2003 | Pennell | G06F 11/362 714/38.14 |
| 6,795,962 B1 | 9/2004 | Hanson | |
| 6,986,124 B1 | 1/2006 | Field et al. | |
| 7,814,463 B2 | 10/2010 | Dandoy | |
| 8,336,029 B1 | 12/2012 | Mcfadden et al. | |
| 8,726,209 B1 * | 5/2014 | Lamant | G06F 11/3664 716/102 |
| 8,904,353 B1 * | 12/2014 | Arguelles | G06F 11/3664 717/124 |
| 9,639,076 B2 * | 5/2017 | Miyoshi | G05B 15/02 |
| 2001/0004766 A1 * | 6/2001 | Koyama | G06F 11/3664 717/128 |
| 2004/0123271 A1 | 6/2004 | Bindewald et al. | |
| 2004/0128585 A1 * | 7/2004 | Hind | G06F 11/366 714/38.14 |
| 2007/0226702 A1 * | 9/2007 | Segger | G06F 11/3624 717/130 |
| 2007/0300209 A1 * | 12/2007 | Bates | G06F 11/3648 717/129 |
| 2008/0134146 A1 * | 6/2008 | Horn | G05B 19/056 717/124 |
| 2008/0270996 A1 * | 10/2008 | Choi | G06F 11/3664 717/129 |
| 2010/0050157 A1 * | 2/2010 | Daniel | G06F 11/3624 717/125 |
| 2010/0050159 A1 * | 2/2010 | Daniel | G06F 11/3624 717/125 |
| 2010/0313186 A1 * | 12/2010 | Chiodo | G06F 11/3624 717/131 |
| 2012/0266139 A1 | 10/2012 | Bates | |
| 2013/0042222 A1 * | 2/2013 | Maddela | G06F 8/70 717/124 |

OTHER PUBLICATIONS

Derek G. Murray et al., "Improving Xen Security through Disaggregation", [Online], ACM 2008, pp. 1-10, [Retrieved from Internet on Jun. 1, 2018], <http://128.232.0.20/research/srg/netos/papers/2008-murray2008improving.pdf>.*

Ilene Seelemann, "Limiting the Probe Effect in Debugging Concurrent Object Oriented Programs", [Online], 1995, pp. 1-12, [Retrieved from Interenet on Jun. 1, 2017], <http://delivery.acm.org/10.1145/790000/781971/p56-seelemann.pdf>.*

Mark Grechanik et al., "Integrating and Reusing GUI-Driven Applications", [Online], 2002, pp. 1-16, [Retrieved form Internet on Jun. 1, 2017], <http://download.springer.com/static/pdf/174/chp%253A10.1007%252F3-540-46020-9_1.pdf>.*

Marc Eaddy et al., "Debugging Aspect-Enabled Programs", [Online], 2007, pp. 200-215, [Retrieved from Internet on Jun. 1, 2017], <http://download.springer.com/static/pdf/278/chp%253A10.1007%252F978-3-540-77351-1_17.pdf>.*

"Java Platform Debugger Architecture Structure Overview" downloaded on Mar. 7, 2014 from docs.oracle.com/javase/6/docs/technotes/guides/jpda/architecture.html pp. 1-3.

"Oracle JDeveloper 11G" Oracle Data Sheet 2009 pp. 1-3.

Katharina Mehner, "JaVis: A UML-Based Visualization and Debugging Environment for Concurrent Java Programs", [Online]. Springer 2002, pp. 163-175, [Retrieved from Internet on May 24, 2014], <http://download.springer.com/static/pdf/365/chp%253A10.1007%252F3-540-45875-1_13.pdf>.

Jianjun Zhao, "Slicing Concurrent Java Programs", [Online], 1999, pp. 1-8, [Retrieved from Internet on May 25, 2014], <http://ieeexplore.ieee.org/stamp/stamp.jsp?tp=&arnumber=777751>.

* cited by examiner

DEBUGGER WITH METHOD RESTART CAPABILITY

This application is a continuation of U.S. patent application Ser. No. 13/788,701, filed Mar. 7, 2013, which is hereby incorporated by reference in its entirety.

BACKGROUND

Software engineers typically spend substantial amounts of time debugging code, often using fairly sophisticated integrated development environments (IDEs) with built-in debuggers. In many cases, the debugger user interface provides a number of different windows or views concurrently, such as separate windows for showing the call stack of the current thread, breakpoint lists, variable values, source code file contents, and so on. While the numerous windows or perspectives into the debugged program may provide very useful information, the workspaces (e.g., computer displays) being used during debugging sessions may typically become rather busy or full, with little additional room for new GUI components.

In some scenarios, debugger users may wish to revisit certain parts of the program being debugged, often more than once as they try to determine the root cause of a complex problem. Depending on the specific debugger and user interface, the available mechanisms to revisit or re-run certain parts of the code may sometimes result in a proliferation of potentially distracting additional windows, panels, or other GUI components. Furthermore, in some cases, the user interfaces may force the user to perform multiple actions (e.g., multiple mouse clicks) to implement some fairly frequently needed debugging operations, resulting in longer, potentially less productive and more irksome debugging sessions.

SUMMARY

Various embodiments of apparatus and methods for debuggers with method restart capability are described. According to one embodiment, a system may include one or more computing devices configured to implement a computer program debugger. The debugger may be configured to implement one or more user interfaces (UIs) enabling a user to submit a request, via a single UI interaction within a debugging session of a program, to restart execution of an invocable operation (such as a method, function, or procedure) included in the source code of the program. In response to a request to restart execution of a particular invocable operation of the source code, received via a single UI interaction via one of the user interfaces, the debugger may designate, as the source code line whose corresponding executable code is to be executed next during the debugging session, the first line of source code of the particular invocable operation that corresponds to an executable operation. (It is noted that at least in some programming languages, some lines at the start of an invocable operation, such as lines comprising variable declarations or comments, may not have any corresponding executable operations, and as a result it may not be possible to resume execution at such non-executable lines.) The debugger may indicate to the user, e.g., via a "next line to be executed" icon or pointer in a graphical UI (GUI) component displaying the source code of the program, that execution of the program being debugged is to be resumed at the first line. The debugger may resume execution of the program being debugged, in a debug mode, at the first line of the invocable operation. The term "in debug mode", as used herein, refers to the fact that the program's execution is managed via the debugger UI, enabling the debugger user to, for example, pause the execution at desired points, inspect/modify program state, and resume execution as desired.

In at least some embodiments, the user may choose which specific invocable operation, among the plurality of invocable operations of a call stack of a particular thread of execution, is to be restarted. For example, debug-mode execution may be resumed at the start of the invocable operation currently executing when the request is received, or at the start of a selected one of the plurality of other invocable operations in the call stack. In one embodiment, when the request to restart a method is received, no new windows, panels or other GUI components may be instantiated or opened, e.g., to avoid any additional clutter on the display being used for the debugging session. Thus, in one example scenario in such an embodiment, if there were four distinct windows or panels open in the debugger GUI at the time a request to restart a method were received, only those four distinct windows or panels would remain open after the debugger restarts the specified method (of course, some of the contents of the windows, such as an indicator of line being executed, variable values, and the like, may differ after restart).

A variety of different programming languages and/or execution environments may be supported in different embodiments. In one embodiment, the program being debugged may be written in a platform-independent, object-oriented programming language such as Java™. In other embodiments, programs written in other languages such as C or C++ may be debugged. The execution environment of the program may comprise a virtual machine (such as a Java™ Virtual Machine or JVM) in some embodiments, and the debugging requests submitted by a user to the debugger (such as method restart requests) may result in one or more corresponding internal requests being transmitted to the virtual machine. In one implementation, for example, in which Java™ is the programming language being used, one or more internal requests expressed using a debugging programmatic interface standard such as JDI (the Java™ Debug Interface) may be issued by the debugger to a JVM that supports JVMTI (the Java™ Tool Interface). To implement the invocable operation restart capability in one embodiment, a plurality of internal debugging requests may be generated, such as, for example, a first request to pop the execution stack of the program to a calling invocable operation from which the particular invocable operation to be restarted was called, and a second request to step into the particular invocable operation to be restarted. It is noted that in at least some embodiments, the execution environment of the program may not provide a capability to move an execution point of the program (e.g., an instruction pointer) to an arbitrary location within the program. Furthermore, in at least some embodiments, a debugger architecture to which the program debugger conforms may not provide a single-step interface enabling a restart of an invocable operation. In such embodiments, despite these constraints of the underlying programming/debugging infrastructure, users may still be able to restart invocable operations using a single user interface interaction.

Several different debugger user interfaces may be available to users that wish to make use of the invocable operation restart capability in various embodiments. Such user interfaces may include IDE (integrated development environment) GUIs that include built-in debuggers, stand-alone debugger GUIs, or command-line debugger interfaces.

In one embodiment, a component of the debugger UI may display a thread's call stack. A drop-down menu (or some similar GUI element) associated with that call stack display component may enable a user to submit a request to restart a particular invocable operation selected from the displayed call stack. In another embodiment, a context-dependent GUI component may provide an action element that a user can employ to restart an invocable operation, or an action to restart a method may be made available from a "run menu" provided to enable IDE users to run programs.

DETAILED DESCRIPTION OF EMBODIMENTS

It is noted that, while for purposes of illustration, the following description is provided largely in the context of debuggers for the Java™ programming language, and to capabilities for restarting Java™ methods, the techniques described may be used for other programming languages and other invocable operations as well. The term "invocable operation" may be used herein to refer to methods, functions, procedures, or similar constructs in various programming languages. In some embodiments, a debugger may be available as an independent or standalone tool, while in other embodiments, a debugger may be incorporated into an integrated development environment (IDE) used by developers, quality engineers, support engineers and the like during various phases of the software development lifecycle. In one embodiment, a debugger may be built in to an execution environment or console—e.g., some programming languages may allow users to submit code via a command-line interpreter or console interface, and debug their code using the same interface.

Figure 1:
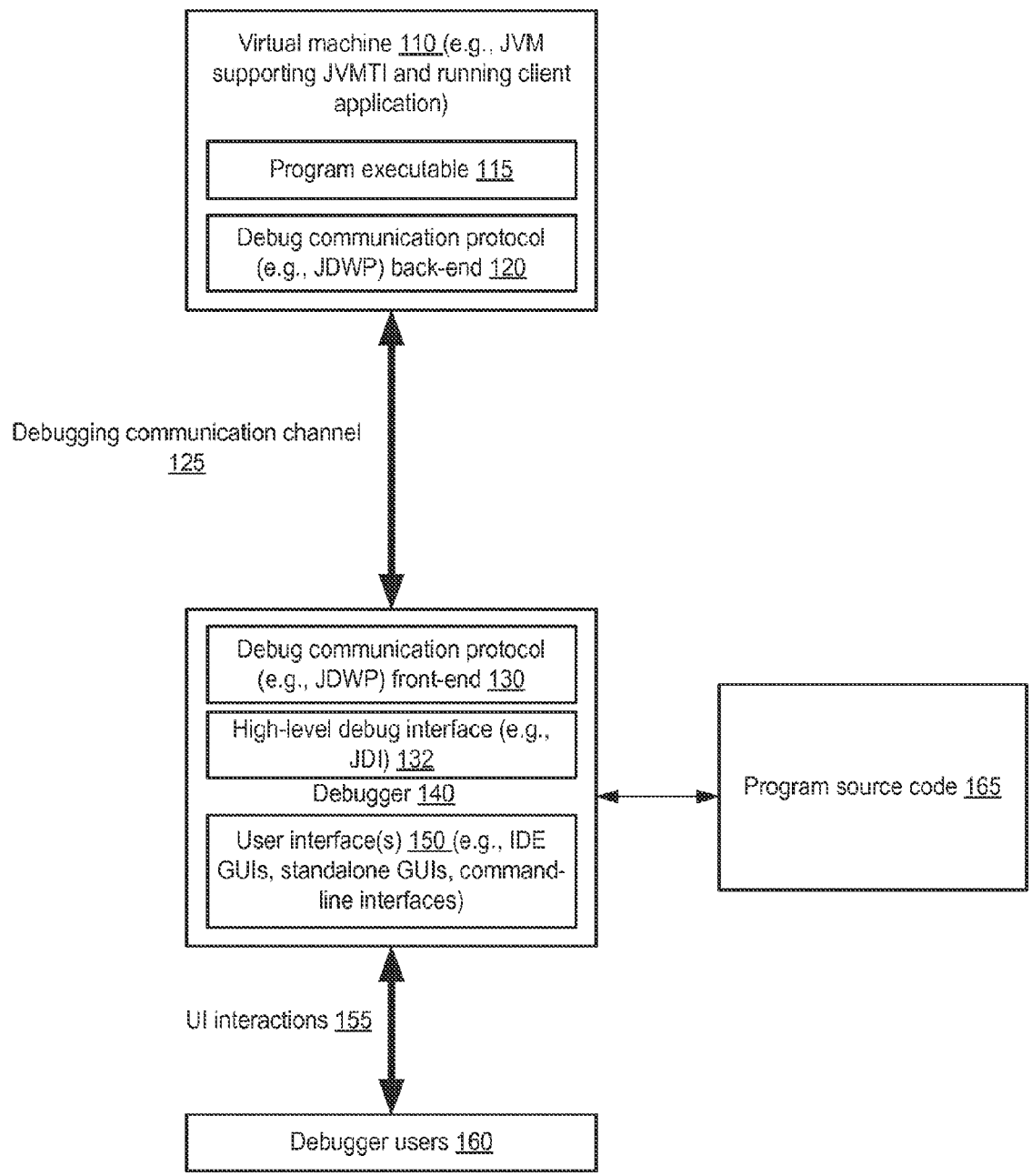
FIG. 1 illustrates an example debugging architecture for programs executed in a virtual machine environment, according to various embodiments.

FIG. 1 illustrates an example debugging architecture for programs executed in a virtual machine environment, according to various embodiments. A debugger may be implemented in accordance with an architecture defined in a published standard in some embodiments, such as the Java™ Platform Debugger Architecture (JPDA). In the depicted embodiment, a JPDA-like architecture is used for a debugger 140 configured to support debugging of programs being executed in a virtual machine 110 such as a JVM. The program being debugged may be referred to as a "debuggee" herein. The virtual machine 110 may support debugging services or programming interfaces defined in the architecture specification, such as interfaces defined by the Java™ VM Tool Interface (JVMTI) or the older (and now deprecated) Java™ VM Debug Interface (JVMDI). Such debugging services or programming interfaces may allow the inspection of the state of an application running in the VM, and/or to control the execution of the application, e.g., by setting/disabling breakpoints, viewing current stack frame contents or the values to which various variables are to be set, modifying variable values, determining which portion of the program is to be executed next during a debugging session, receiving notifications when a breakpoint is reached, and the like. In the Java™ context, JVMTI and/or JVMDI are examples of native interfaces implemented by at least some versions of the JVM on various platforms, in contrast to platform-independent protocols such as Java Debug Interface (JDI) that may be used by debugger front-ends as described below. Similar interfaces may be defined for other programming language environments and/or virtual machine environments in other embodiments. It is noted that in some embodiments, the debugger may be used for programs that are not executed in virtual machines.

As shown, the virtual machine 110 may include the executable code 115 of the program being debugged, and may also include a back-end component 120 of a debug communication protocol such as the Java™ Debug Wire Protocol (JDWP) in some embodiments. The communication protocol may define the format of information and requests transferred between the debuggee and the debugger 140. In some embodiments, the protocol specification may allow the debuggee and the debugger to run under separate VM implementations and/or on separate platforms. The protocol may support flexible debugger implementations in several ways: for example, the programming language in which the debugger is written need not be the same language used for the debuggee, and the details of the transport mechanism to be used for the communication (e.g., sockets, serial lines, or shared memory) may be left to the debugger implementer as well. A front-end component 130 of the debug communication protocol may be used by the debugger 140 to interact with the virtual machine 110 in the depicted embodiment, e.g., over a debugging communication channel 125. In at least some embodiments, a high-level platform-independent front-end interface 132 (e.g., a Java™ interface such as the Java Debug Interface (JDI)) may be defined in the debugger architecture, enabling vendors to implement debuggers in high-level languages, even though the virtual machine information actually transmitted via the communication protocol may not use that high-level language. The high-level front-end interface (such as JDI) may, for example, define mirror or proxy classes to examine or manipulate various aspects of the state of the virtual machine in some embodiments.

In some embodiments the communications may occur across network links (i.e., the VM 110 at which the program being debugged is run may be instantiated on a different hardware device than the device at which the debugger 140 runs, and the two hardware devices may be connected via one or more network links), while in other embodiments, the communications may be confined within a single hardware device (i.e., the VM and the debugger may run on the same hardware device or host). In at least some embodiments a debugger 140 may be usable for both local and non-local debugging, i.e., the debugger may be able to connect to remote VMs or debuggee programs when needed and with local VMs or debuggees as needed. In one embodiment a debugger 140 may be used to debug more than one debuggee concurrently—e.g., in a producer-consumer scenario where two programs are communicating, the same debugging session may be used to debug the operations of both the producer program and the consumer program.

A number of different user interfaces 150 may be implemented by the debugger 140, such as one or more GUIs, command-line interfaces and the like. In some embodiments the debugger interface may be combined with, or be part of, a more comprehensive Integrated Development Environment (IDE) user interface. An IDE may be used by software engineers for various purposes other than just debugging in various embodiments, e.g., for designing, developing, building, testing, or browsing the code, and/or for packaging/deploying the code to application servers or other execution platforms. UI interactions 155 between the debugger 140 and its users 160 may include, for example, various action requests submitted by the users, such as to start or terminate a debugging session, add or remove debugging breakpoints, browse source code 165 of the debuggee program, and the like. A debugging session may thus comprise a plurality of requests from the user 160, and corresponding responses to those requests by the debugger 140; to respond to at least some of the requests, the debugger may send internal requests to the debuggee or the VM 110 in which the debuggee program runs. In at least some embodiments, as a debugging session proceeds, the part of the source code 165 that is being executed currently may be indicated via one of the UIs, e.g., by icons or symbols indicating the source code lines whose corresponding executable instructions are run, or indicating the source code line that is to be executed next.

In one embodiment, the UI or UIs 150 implemented by the debugger 140 may enable a user 160 to submit a request, via a single UI interaction within a debugging session of a program, to restart execution of an invocable operation such as a method or a function included in the source code 165 of the program. It is noted that in at least some embodiments, the execution environment of the program being debugged (e.g., a JVM environment) may not provide a capability to move an execution point of the program (e.g., an instruction pointer) to an arbitrary location within the program. Furthermore, in at least some embodiments, a debugger architecture to which the program debugger conforms (such as JPDA) may not provide a single-step interface enabling a restart of an invocable operation. In such embodiments, despite these constraints of the underlying programming/debugging infrastructure, users may still be able to restart invocable operations using a request issued via a single UI interaction. In response to such a request, the debugger 140 may designate, as the source code line whose corresponding executable code is to be executed next during the debugging session, the first line of source code of the particular invocable operation that corresponds to an executable operation. (Thus, the debugger may not designate as the next-to-be-executed line, any source code line at or near the beginning of the invocable operation that does not have corresponding executable instructions, such as a line comprising variable declarations or comments). In at least some embodiment, visual evidence or indications of the restart of the method, or of the next line to be executed, may be provided to the user 160, e.g., by modifying the location of a cursor or a "next-line" symbol or icon, or changing the color of the designated first line in a display of the source code 165. The debugger may resume the execution of the program in debug mode at the first line. In some embodiments, depending for example on user preferences or settings, if the first line does not have an associated breakpoint, the program may be executed until the next breakpoint (after the first line) is reached, while in other embodiments, the debugger may pause execution at the first line by default, allowing the user to indicate whether the code is to be stepped through one line at a time, or whether the code should be executed to the next breakpoint after the restart of the invocable operation.

In some implementations, a user 160 may submit a request to restart any of various methods of the current thread's execution stack, including for example the currently-executing method or any of the methods whose invocations led to the invocation of the currently-executing method. In some implementations, in order to restart a given method M1, the debugger 140 may submit a plurality of requests to the VM or the debuggee—e.g., one request to pop the execution stack to M1's caller method M2, and another request to step into M1 after the stack has been popped as requested. In scenarios where one of multiple methods (e.g., M1, M3 or M4) could have been called from the same source code line in the calling method M2, e.g., if a chained expression or a conditional expression was used to select the method to be called, the method M1 whose restart is requested by the user would be stepped into in such an implementation, without requiring any input from the user to select from among the multiple options for the next-called method. The fact that multiple internal requests were made may not be indicated to the user 160 in at least some embodiments—e.g., as far as the user 160 is concerned, a single action request to restart a method was submitted, and the debugger responded by resuming execution as requested in a single response step. The internal requests issued by the debugger may be written in accordance with the high-level debug interface 132 such as JDI in one embodiment. In some embodiments, there may be no change to the number of windows or panels being displayed in the UI—e.g., if the debugger was displaying N windows before a restart method request was received, the same N windows would continue to be displayed (although contents of some of the windows may be changed, such as the indication of the next-to-be-executed line, the values of variables, and so forth). In this way, users 160 of debugger 140 may be able to resume debugging at the start of a specified method without being distracted by instantiation of any additional GUI components in such embodiments.

Figure 2:
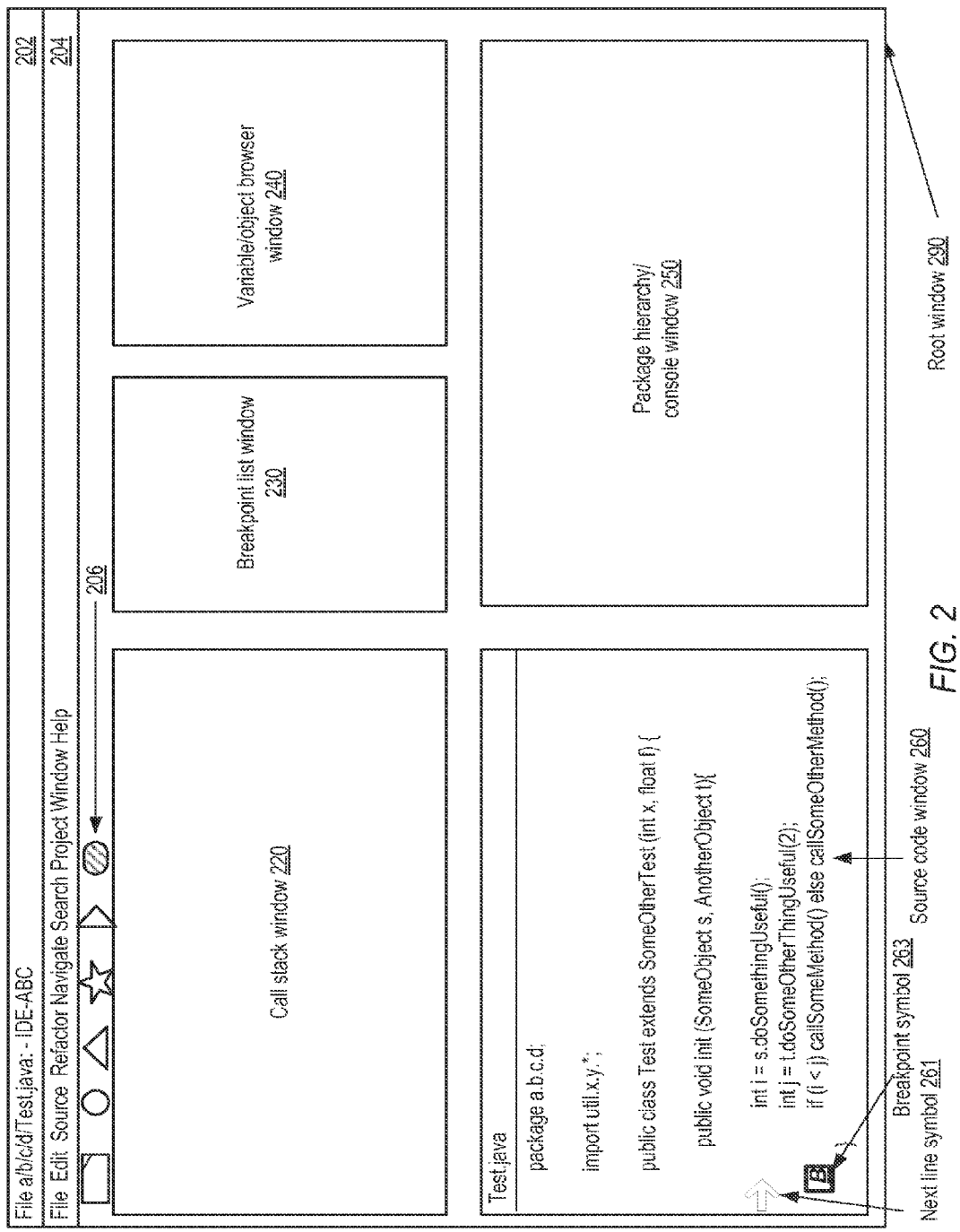
FIG. 2 is a block diagram illustrating example GUI components of an IDE that includes a debugger, according to at least some embodiments.

FIG. 2 is a block diagram illustrating example GUI components of an IDE that includes a debugger, according to at least some embodiments. In the illustrated embodiment, the IDE presents a GUI with a number of distinct windows or panels, such as windows 220, 230, 240, 250 and 260. In the depicted embodiment these windows are shown as being contained within a single encompassing root window 290; however, in at least some embodiments, some or all of the windows may be detachable from the root window 290 based on the user's preferences, and may be arranged independently of each other on the display being used. Windows may also be rearranged within the root window in some implementations. The IDE UI may include a header line 202, in which the name of the IDE and/or the current source file or source code directory being viewed may be indicated. One or more toolbars showing respective sets of high-level or global commands (such as toolbar 204 with options such as "File", "Edit", and the like, and toolbar 206 with icon representations of command sets) may be displayed in some embodiments.

During debugging sessions, the IDE UI may include a call stack window 220 displaying the execution stack(s) for one or more threads of the program being debugged. Window 230 may display a list of the breakpoints that have been set up in the program, while object/variable browser window 240 may show variables or other objects of the program, together with various properties or values of the variables or objects. Window 250 may be used to display either a view of the source code hierarchy (e.g., a package hierarchy in Java™ environments), or console contents, depending on the user's preference in the depicted example. Console contents may show status information of the debug session—e.g., whether the debuggee program is paused at a breakpoint, whether any errors occurred, whether the debugger is waiting for user input, and so on. In some embodiments, the console contents may be shown in a different window than the source code hierarchy.

Source code window 260 may display the contents of one or more source code files of the program being debugged, such as the file named Test.java in the depicted example. (Multiple source code files may be shown using respective tabs associated with the window 260 in some implementations). A next-line symbol 261 may indicate the next source code line whose corresponding executable instructions are to be run next during the debugging session. Breakpoints, if any, in the displayed source code may be indicated by breakpoint symbol 263. Each of the windows displayed in the IDE UI may include a respective toolbar in some embodiments. One or more of the windows may allow users to bring up context-dependent menus, e.g., by right-clicking using a mouse within the window. One or more of the windows shown in FIG. 2 may allow users to submit requests to restart methods or other invocable operations, as described below in further detail.

Figure 3A:
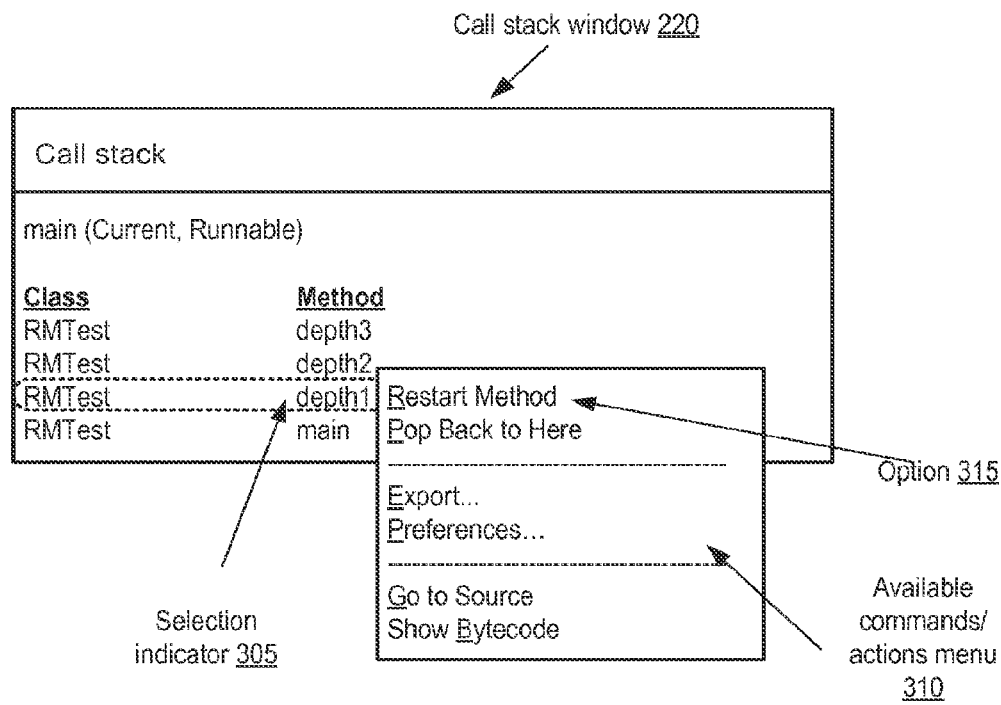
FIGS. 3a, 3b and 3c illustrate respective examples of GUI elements that may be used to request method restarts in a debugging session, according to at least some embodiments.
Figure 3B:
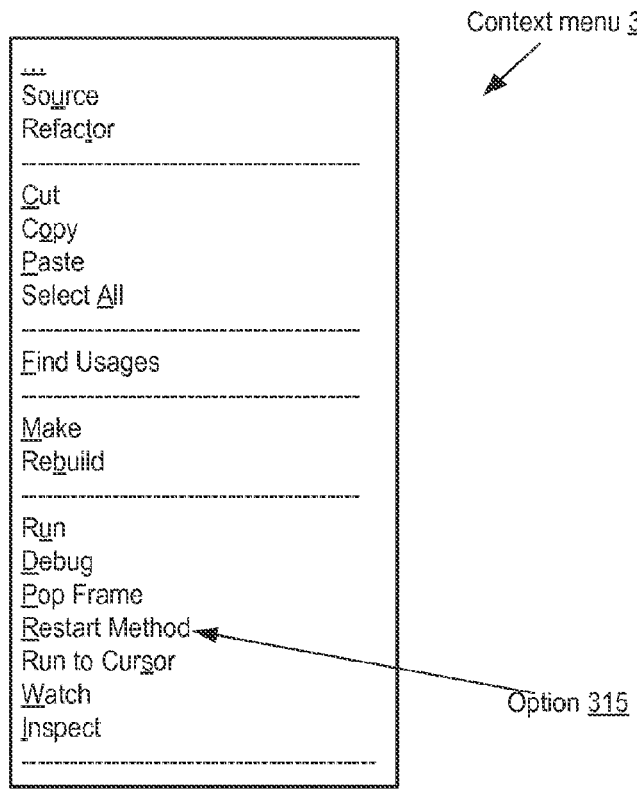
Figure 3C:
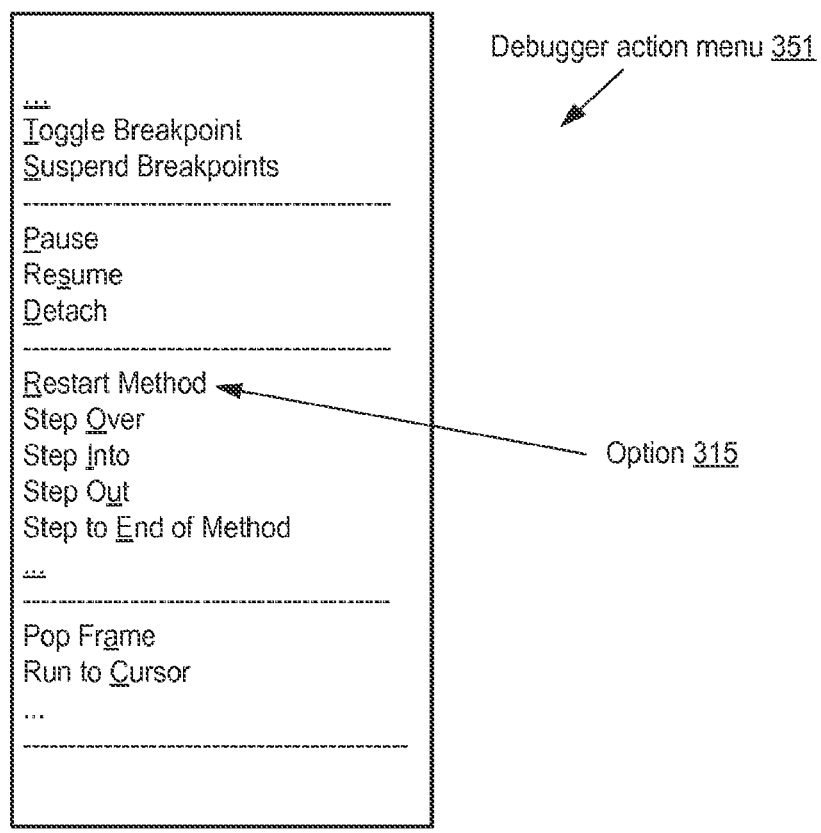

FIGS. 3a, 3b and 3c illustrate respective examples of GUI elements that may be used to request method restarts in a debugging session, according to at least some embodiments. FIG. 3a illustrates a call stack window 220, within which the call stack of the currently-executing thread is shown. The example call stack indicates that a method "depth1" of a class "RMTest" called method "depth2" and that "depth2" called "depth3". As shown by the selection indicator 305, "depth1" has been selected by the user. The available commands/actions menu 310 (which may for example be displayed in response to the selection of the method, or in response to a right-click after the method is selected) indicates the set of actions that can be requested on the selected method "depth1". The "Restart Method" option 315 may be used to request a resumption of execution of the debuggee program at the start of the selected method "depth1" in the depicted example.

FIG. 3b illustrates a second alternative that may be available in some debugger UIs to request method restarts. A context menu 321, which may be displayed in response to a context-specific click in the debugger GUI or the IDE GUI, may list "Restart Method" 315 as one of the available actions. Clicking on the "Restart Method" option in the context menu 321 may result in the resumption of execution at the start of the currently-executing method in at least some embodiments. In other embodiments, if a method other than the currently-executing method is selected in a call stack window and the "Restart Method" option 315 is activated from the context menu 321, execution may be resumed at the selected method.

FIG. 3c illustrates another alternative approach that may be implemented for restarting method UIs in some embodiments. In the depicted example, a debugger-specific action menu 351, that may include a variety of debugger option options such as "Pause" (to pause debug-mode execution), "Resume" (to resume debug-mode execution). "Suspend Breakpoints" and the like, may be enhanced by adding a "Restart Method" option 315. The currently-executing method may be restarted using this option in some embodiments. As in the case of FIG. 3b, in some embodiments, a selected method other than the currently-executing method may be restarted in other embodiments.

Figure 4:
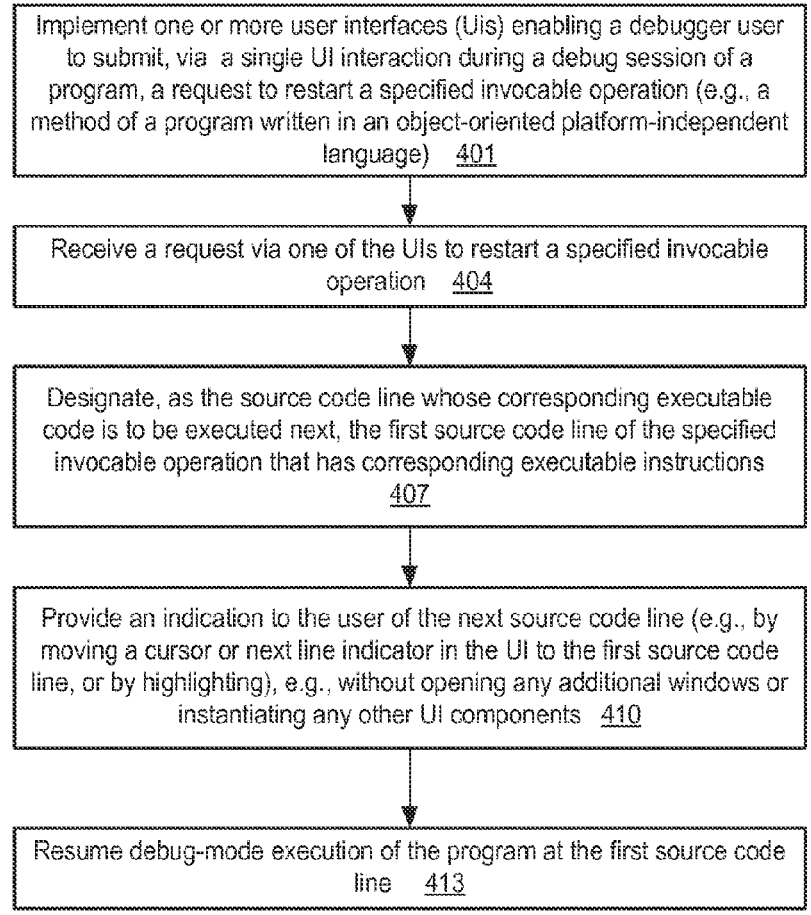
FIG. 4 is a flow diagram illustrating aspects of operations that may be performed to support restarts of invocable operations during debugging sessions, according to at least some embodiments.

FIG. 4 is a flow diagram illustrates aspects of operations that may be performed to support restarts of invocable operations during debugging sessions, according to at least some embodiments. As shown in element 401, one or more user interfaces may be implemented to enable a user of a debugger to submit, e.g., via single UI interaction, a request to restart a specified invocable operation such as a method or a function. The currently-executing method (or other invocable operation) may be restarted in some embodiments via the UI interaction, while in other embodiments any selected invocable operation of the call stack of a current thread may be restarted.

A debugger 140 may receive a request via one of the UIs to restart a specified invocable operation (element 404). In response, the debugger may designate, as the source code line whose corresponding executable instructions are to be executed next in the debugging session, the first line of source code of the invocable operation for which executable code exists (element 407). In at least some embodiments, the debugger may provide an indication to the user (element 410) of the source code line whose executable instructions are to be run next—e.g., by moving a cursor, a "next line symbol" 261 or its equivalent to the designated line, or by highlighting the designated line.

In at least some embodiments, no new windows or panels may be instantiated or opened as a result of the request to restart the invocable operation. The debug-mode execution of the program may be resumed at the designated source code line (element 413).

Figure 5:
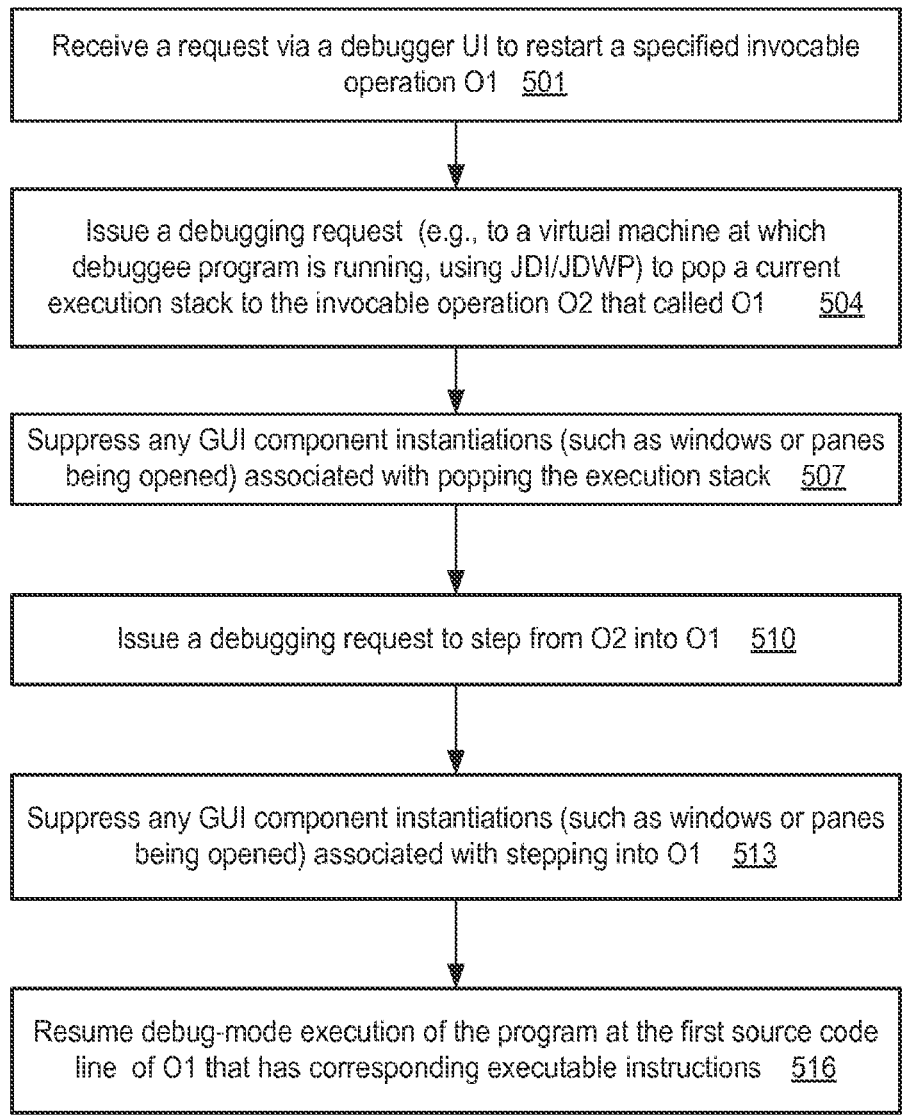
FIG. 5 is a flow diagram illustrating operations performed to send requests to a debuggee, without instantiating any additional graphical user interface components, to restart an invocable operation, according to at least some embodiments.

In at least some embodiments, there may be a plurality of requests sent from the debugger to the debuggee or the VM in which the debuggee runs to accomplish the restart of the revocation operation. FIG. 5 is a flow diagram illustrating operations performed to send requests to a debuggee to restart an invocable operation, without instantiating any additional graphical user interface components, according to at least some embodiments. As shown in element 501, a request may be received via a debugger UI to restart a specified invocable operation O1. In response, a first debugging request may be sent (e.g., using JDI and/or JDWP to a debuggee running at a virtual machine) to pop the execution stack of the current thread until the caller invocable operation O2, from which O1 was invoked, reaches the top of the stack (element 504). Any GUI component instantiations associated with popping the stack may be suppressed (element 507); i.e., the user may not be made aware that the stack is being popped in response to the restart request. In at least some embodiments, if the call stack is currently being displayed in a GUI component at the time that the request is received, any changes to that call stack display may also be suppressed until the operations corresponding to element 513 are performed.

After the request to pop the stack has been sent, in the depicted embodiment, another debugging request may be send to the debuggee, this time to step from O2 into O1 (element 510). Once again, any GUI component instantiation associated with the "step into O1" request may be suppressed (element 513). The debug-mode execution of the program may then be resumed at the first line of O1 with corresponding executable instructions (element 514). Thus, in the depicted embodiment, the use of the separate debugging requests may not be revealed to the user of the debugger; to the user, a single-step request to restart a specified method may appear to have a single-step response.

FIG. 5 is a block diagram illustrating a computing device 3000 configured to implement a debugger 140 with support for the invocable operation restart capability described above, according to at least some embodiments. The computing device 3000 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. In the illustrated embodiment, computing device 3000 includes one or more cores or processors 3010 (e.g., 3010a, 3010b, or 3010n) coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several cores or processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the SPARC, x86, PowerPC, or MIPS ISAs, or any other suitable ISA. In multiprocessor systems, each of processors 3010 may commonly, but not necessarily, implement the same ISA.

System memory 3020 may be configured to store program instructions implementing the debugger 140 in the depicted embodiment. In some embodiments system memory may also store source code 3025 of various programs to be debugged, executable code 3028 of the programs, and/or an execution environment 3027 similar to VM 110 of FIG. 1. System memory may also include program instructions and/or data for various other applications. Program instructions may be encoded in platform native binary, any interpreted language such as Java™ bytecode, or in any other language such as C/C++, Java™, etc or in any combination thereof. In various embodiments, system memory 3020 may be implemented using any suitable memory technology, such as static random access memory (SRAM), synchronous dynamic RAM (SDRAM), nonvolatile/Flash-type memory, or any other type of memory.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, for example. Such other devices 3060 may host the debuggee program and/or a VM executing the debuggee program in some embodiments. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

Figure 6:
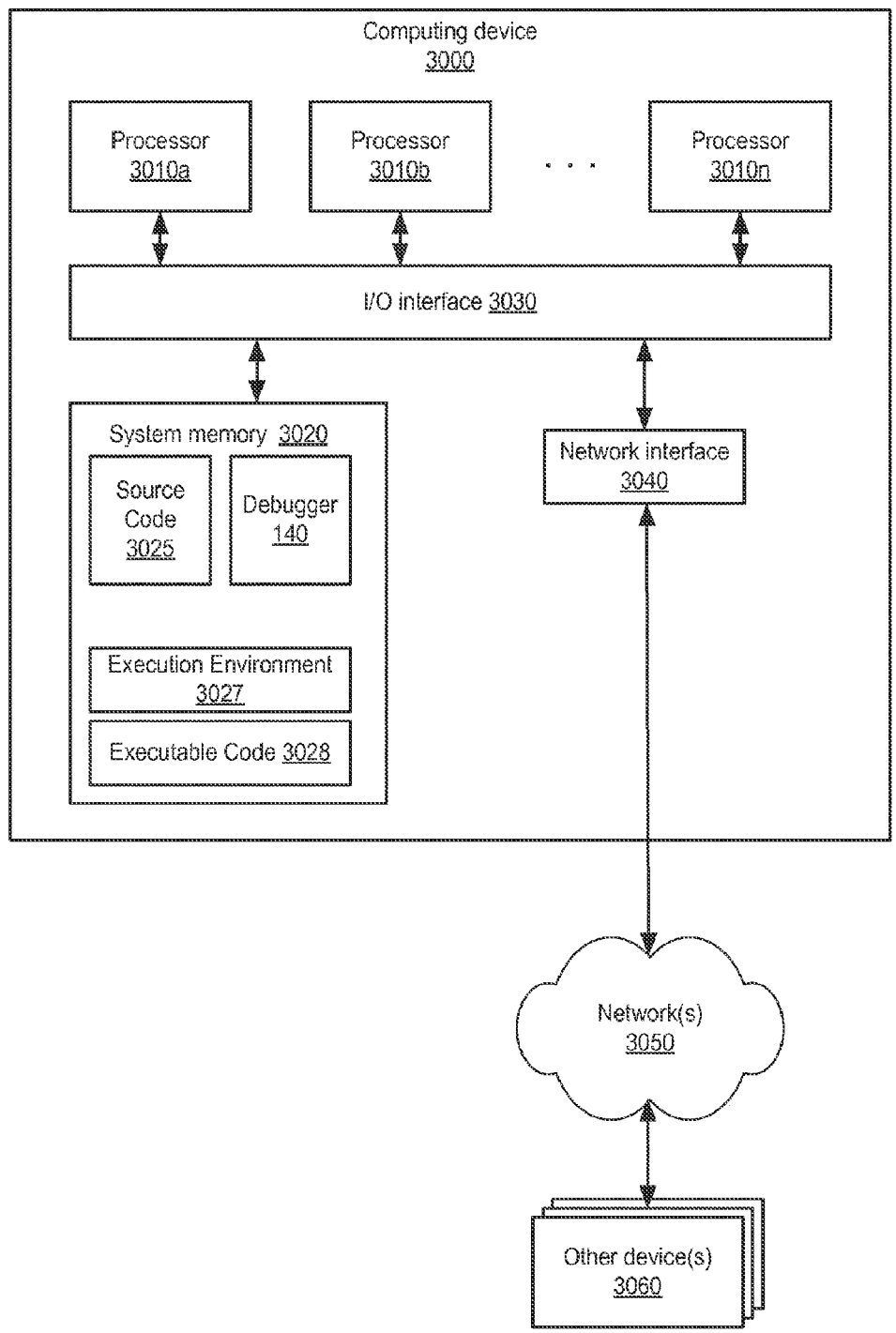
FIG. 6 illustrates an example computing device that may be used in some embodiments.

In some embodiments, system memory 3020 may be one embodiment of a computer-accessible medium configured to store program instructions and data as described above for FIG. 1 through FIG. 5 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer implemented method, comprising:

implementing one or more user interfaces (UIs) enabling a user to submit a request, via a single UI interaction within a debugging session of a program, to restart execution of an invocable operation included in source code of the program; and in response to a particular request to restart execution of a particular invocable operation of the source code, the request to restart execution received via a single UI interaction according to a particular user interface of the one or more interfaces, designating, as a next source code line to be executed for debugging purposes during the debugging session, a first line of source code of the particular invocable operation that corresponds to an executable operation, wherein at least one instruction of the particular invocable operation has been executed previously during the debugging session;

indicating, to a submitter of the particular request, that execution of the program being debugged is to be resumed at the first line; and resuming execution of the program being debugged, in a debug mode, at the first line, such that the next line executed in the debugging session in response to the particular request is the first line of the particular invocable operation, and such that the at least one instruction of the particular invocable operation that has been executed previously during the debugging session will be executed again, subsequent to execution of the first line of the particular invocable operation.

2. The method as recited in claim 1, wherein an execution environment of the program does not provide a capability to move an execution point of the program to an arbitrary location within the program.

3. The method as recited in claim 1, wherein, at the time that the particular request is received, the debugger displays a set of one or more graphical user interface (GUI) components, and wherein no additional GUI components are instantiated in response to the particular request.

4. The method as recited in claim 1, wherein the program is written in a platform-independent object-oriented programming language, and wherein the particular invocable operation comprises a method.

5. The method as recited in claim 1, wherein to designate the first line as the next source code line to be executed, a debugger is configured to send one or more debugging requests to a virtual machine at which the program is being executed.

6. A system, comprising:

one or more processors; and memory coupled to the one or more processors, wherein the memory stores program instructions that when executed on the one or more processors cause the one or more processors to implement a program debugger configured to:

implement one or more user interfaces (UIs) enabling a user to submit a request, via a single UI interaction within a debugging session of a program, to restart execution of an invocable operation included in source code of the program; and in response to a particular request to restart execution of a particular invocable operation of the source code, the request to restart execution received via a single UI interaction according to a particular user interface of the one or more interfaces, designate, as a source code line whose corresponding executable code is to be executed next during the debugging session, a first line of source code of the particular invocable operation that corresponds to an executable operation, wherein at least one instruction of the particular invocable operation has been executed previously during the debugging session;

indicate, to a submitter of the particular request, that execution of the program being debugged is to be resumed at the first line; and resume execution of the program being debugged, in a debug mode, at the first line, such that a next line executed in the debugging session in response to the particular request is the first line of the particular invocable operation, and such that the at least one instruction of the particular invocable operation that has been executed previously during the debugging session will be executed again, subsequent to execution of the first line of the particular invocable operation.

7. The system as recited in claim 1, wherein an execution environment of the program does not provide a capability to move an execution point of the program to an arbitrary location within the program, and wherein a debugger architecture to which the program debugger conforms does not provide a single-step interface enabling a restart of an invocable operation.

8. The system as recited in claim 1, wherein the particular invocable operation is a current invocable operation being executed in the debugging session at the time that the particular request is received.

9. The system as recited in claim 1, wherein, at a time that the particular request is received, the debugger displays a set of one or more graphical user interface (GUI) components, and wherein no additional GUI components are instantiated in response to the particular request.

10. The system as recited in claim 1, wherein the program is written in a platform-independent object-oriented programming language, and wherein the particular invocable operation comprises a method.

11. The system as recited in claim 1, wherein to designate the first line as the next source code line to be executed, the debugger is configured to send one or more debugging requests to a virtual machine at which the program is being executed.

12. The system as recited in claim 6, wherein the one or more debugging requests comprise a first debugging request and a second debugging request, wherein the first debugging request comprises a request to pop an execution stack of the program to a calling invocable operation from which the particular invocable operation is called, and wherein the second debugging request comprises a request to step into the particular invocable operation.

13. The system as recited in claim 1, wherein the one or more user interfaces includes a particular GUI component displaying a current call stack of invocable operations, wherein the particular invocable operation is displayed as a currently selected operation, and wherein the single UI interaction comprises requesting a restart action from a drop-down menu associated with the GUI component.

14. The system as recited in claim 1, wherein the one or more user interfaces includes a particular context-dependent GUI component including a list of available actions, wherein the single UI interaction comprises selecting an action, in the list of available actions, to restart a currently executing method.

15. The system as recited in claim 1, wherein the debugger is incorporated as a component of an integrated development environment (IDE).

16. A non-transitory computer-readable storage medium storing program instructions executable by one or more processors to implement a debugger configured to:

implement one or more user interfaces (UIs) enabling a user to submit a request, via a single UI interaction within a debugging session of a program, to restart execution of an invocable operation included in source code of the program; and in response to a particular request to restart execution of a particular invocable operation of the source code, the request to restart execution received via a single UI interaction according to a particular user interface of the one or more interfaces, designate, as a source code line whose corresponding executable code is to be executed next for debugging purposes during the debugging session, a first line of source code of the particular invocable operation that corresponds to an executable operation wherein at least one instruction of the particular invocable operation has been executed previously during the debugging session;

indicate, to a submitter of the particular request, that execution of the program being debugged is to be resumed at the first line; and resume execution of the program being debugged, in a debug mode, at the first line, such that the next line executed in the debugging session in response to the particular request is the first line of the particular invocable operation, and such that the at least one instruction of the particular invocable operation that has been executed previously during the debugging session will be executed again, subsequent to execution of the first line of the particular invocable operation.

17. The non-transitory computer-readable storage medium as recited in claim 16, wherein the particular invocable operation is a current operation being executed in the debugging session at the time that the particular request is received.

18. The non-transitory computer-readable storage medium as recited in claim 16, wherein, at a time that the particular request is received, the debugger displays a set of one or more graphical user interface (GUI) components, and wherein no additional GUI components are instantiated in response to the particular request.

19. The non-transitory computer-readable storage medium as recited in claim 16, wherein a debugger architecture to which the debugger conforms does not provide a single-step interface enabling a restart of an invocable operation.

20. The non-transitory computer-readable storage medium as recited in claim 16, wherein to designate the first line as the next source code line to be executed, the debugger is configured to send one or more debugging requests to a virtual machine at which the program is being executed.

\* \* \* \* \*